Patented Mar. 10, 1936

2,033,823

UNITED STATES PATENT OFFICE 2,033,823

SYNTHETIC RESINS AND PROCESS OF MAKING SAME

Alphonse Gams and Theodor Sutter, Basel, Switzerland, assignors, by mesne assignments, to Ciba Products Corporation, Dover, Del.

No Drawing. Application June 29, 1933, Serial No. 678,309. In Switzerland July 5, 1932

5 Claims. (Cl. 260—3)

This invention relates to improved moldable synthetic resins from primary aromatic amines and aldehydes. It comprises the manufacture of these resins and the products themselves and their transformation into molded bodies.

It is known that primary aromatic amines react with more than an equimolecular proportion of formaldehyde in a mineral acid solution with the formation of condensation products which are infusible and insoluble but thermoplastic and can be converted by heat and pressure into very valuable molded objects. The customary procedure consists in first dissolving the amine in a mineral acid and then adding a formaldehyde solution, it being of importance that the temperature of the reaction does not rise too high. For this purpose the formaldehyde may be allowed to run slowly into the solution of the amine. The resistance to heat and the mechanical strength of the molded articles increase as the content of formaldehyde is increased, but so also do the temperatures and pressures necessary for the molding operation. Even a small excess of formaldehyde, for example 0.2 molecular proportion, leads to condensation products having only a moderate capacity for flowing, which is a disadvantage especially in the molding of articles of complicated shape. When there are used 1.5 to 1.7 molecular proportions of formaldehyde it is necessary to apply at pressures ordinarily employed a molding temperature of 180–200° C. and higher in order to obtain in a short time clear molded articles.

The flow of the resins can indeed be improved by the addition of softening agents, but at the expense of their resistance to heat. If instead of an indifferent flux there is added an aldehyde or a substance which yields aldehyde, both the flow and the resistance to heat are improved in a remarkable degree, especially when either furfurol or a phenol-poly-alcohol is used, but in most cases at the expense of the light color or transparency of the molded articles.

This invention relates to improvements in the manufacture of resins from formaldehyde and a primary aromatic amine in the presence of a considerable proportion of a strong mineral acid, whereby the resultant condensation products flow well even without the addition of a softening or fluxing agent and after molding are remarkably resistant towards heat, these resins containing the formaldehyde required for hardening; not as a mechanical admixture, but in chemical combination. For this purpose care is taken that the amine, or at least a substantial proportion of it, is brought into reaction with more than two molecular proportions of formaldehyde, advantageously at a raised temperature. The amine is preferably used in the form of a salt with a mineral acid, for example, in the form of the hydrochloride. However, it is also possible to add to the formaldehyde the necessary quantity of a strong mineral acid, advantageously about an equimolecular proportion. By the expression "considerable proportion" of mineral acid is to be understood a proportion of about ½ a molecular proportion and more for each molecular proportion of the amine. Referring to the mineral acids, the hydro-halogen acids and sulfuric acid are particularly applicable.

The process of the invention differs from the various processes for condensing primary aromatic amines in organic solvents with an excess of formaldehyde in the presence of organic acids both in the use of a strong mineral acid advantageously in about equivalent quantities and in the omission of the expensive solvent. It is distinguished above all, however, by the final products, which are insoluble in benzene and yield clear, light yellow to red molded articles of very good resistance to mechanical and thermal influences, whereas the aforesaid known processes lead to resins which are soluble in benzene and can be hardened to a certain degree but yield molded articles of good resistance to heat only after treatment with a further quantity of aldehyde in the presence of an acid condensing agent.

The new products also show marked chemical differences from the condensation products described in copending application, Serial No. 245,039. This application discloses and broadly claims the molding of infusible amine-formaldehyde resins which are produced in a mineral acid solution from primary aromatic amine, particularly aniline, and an excess of formaldehyde, that is, more than an equimolecular proportion of formaldehyde, then freed from acid, dried and comminuted. However, no reference is made in the said application to the manufacture of condensation products capable of being hardened and easily molded, which products, after molding, exhibit an excellent resistance to heat. As comparative analyses have shown, the new products have an appreciably higher content of oxygen, which indicates that the formaldehyde is bound at least partly in the form of methylol groups, whereas when operating as described in the aforesaid application the formaldehyde appears to be bound in greatly preponderating amount in the form of methylene-groups. This is in agreement with the fact that the new resins show a distinct capacity for undergoing hardening, viz. thermo-setting properties, resins of this type molded at a low temperature having a substantially lower resistance to heat than those which have been molded at a higher temperature or have been subjected to a suitable heat treatment before or after molding.

These properties of the new resins are most clearly pronounced when aniline hydrochloride, for instance, is allowed to run into a large excess (3–5 molecular proportions) of formaldehyde at a temperature above 50° C., or when, likewise at a raised temperature, the excess formaldehyde is added to the salt of the amine not gradually but as far as possible all at once. However, it is possible to attain a partial improvement even without the use of a large excess of formaldehyde and even when the total quantity of formaldehyde used is less than two molecular proportions, for example 1.5 molecular proportions, if care be taken, by slowly introducing the salt of the amine into the formaldehyde solution, so that at least the greater part of the amine during its addition can react in the presence of a proportion of formaldehyde exceeding two molecular proportions. It is advantageous to introduce the amine into a hot formaldehyde solution, for the formation of resins which flow easily is favored by higher temperatures.

It has been found that while the use of a temperature exceeding 50–60° C. renders control of the reaction difficult and may easily cause damage to the mechanical properties of the resin when there is used only a small excess of formaldehyde (a total of 1.2–1.4 molecular proportions of formaldehyde for each molecular proportion of amine), the use of temperatures up to boiling temperature in the process of the present invention scarcely diminishes the mechanical strength of the products and very substantially increases the capacity for flowing. The most favorable conditions can easily be determined in each case by preliminary experiments.

If the proportion of acid be substantially reduced, for example below ½ a molecular proportion for each molecular proportion of the base, the products approach in some of their properties the resins which are obtained in the presence of organic acids in organic solvents; that is to say, their solubility increases, they soften at a relatively low temperature and they can be molded by themselves only after a preliminary heat treatment.

Since when operating with solutions of amine salts, such as aniline hydrochloride, at moderate temperatures the capacity for flowing decreases progressively as the quantity of formaldehyde is increased from 1 to about 2 molecular proportions for each molecular proportion of amine, it could not be foreseen that by use of the same reactants and by simple alteration of the conditions in such a manner that the action of an excess of formaldehyde exceeding 2 molecular proportions on at least a substantial part of the amine is assured and this course of reaction favored if necessary by an increase in temperature, the capacity of the resin for flowing could be increased in such a considerable degree, without diminution of the resistance to heat as is the case when the condensation with an excess of formaldehyde takes place in an organic solvent and in presence of an organic acid.

When the acid is eliminated from the reaction mixture the new resins are thrown down in the form of voluminous precipitates. The new resins may be mixed at any stage of their production with filling materials, softening agents, hardening agents, dyestuffs and the like. In particular, they are suitable for the production of paper containing resin. They facilitate the homogeneous molding of superimposed layers of the paper and lead to products having very remarkable resistance to heat.

The following examples illustrate the invention, the parts being by weight:—

Example 1

865 parts (about 10 mol.) of a commercial solution of formaldehyde, 1200 parts of water and 25 parts of concentrated hydrochloric acid are heated to 50° C. in an enamelled vessel provided with a stirrer and in the course of 10 minutes a solution of 260 parts of aniline hydrochloride (2 mol.) in 1000 parts of water is allowed to run in in a thin stream, while vigorously stirring. The solution becomes dark red and faintly turbid. It is stirred for a further 5 minutes at 55° C. and then neutralized by means of caustic soda solution. The condensation product separates in the form of a voluminous white precipitate, which is washed and dried. There is obtained a white powder which can be molded at a pressure of 100–250 kg/cm$^2$ even at 145° C. into clear yellow to red objects; however, the mechanical and thermal properties are substantially improved if the molding temperature is raised to 165° C.

Example 2

780 parts (about 9 mol.) of commercial formaldehyde solution, 1000 parts of water and 25 parts of concentrated hydrochloric acid are heated to boiling in a vessel provided with a stirrer and a reflux condenser and in the course of 4 minutes there is run in, while vigorously stirring, a solution of 280 parts (3 mol.) of aniline, 270 parts of concentrated hydrochloric acid and 1000 parts of water. The solution becomes deep red and remains completely clear. It is allowed to stand for a further 16 minutes at 90–100° C. and is then introduced into a cold dilute solution of caustic soda. There separates a voluminous white precipitate which after having been washed, dried and ground is obtained as a white to faintly yellow powder. The product has quite an excellent flow even at low temperatures so that pressures from 50 kg/cm$^2$ upwards may be applied, but also in this case it is advantageous to use a molding temperature of 160–170° C. or to subject articles molded at 145° C. to an after-treatment at a higher temperature.

Example 3

260 parts (2 mol.) of aniline hydrochloride are dissolved in 2000 parts of water, the solution is heated to 95° C. and there are then run into it as far as possible all at once 870 parts (about 10 mol.) of commercial formaldehyde solution, while vigorously stirring. The temperature rises to about 100° C. and is maintained at this point for several minutes. The solution becomes deep red and remains completely clear. After neutralization, washing and drying there is obtained a product which is very similar to that of Example 1.

Example 4

2000 parts of water, 390 parts (4.5 mol.) of formaldehyde solution and 25 parts of concentrated hydrochloric acid are heated to boiling in an enamelled vessel provided with a stirrer and reflux condenser and there is run in, while vigorously stirring, a solution of 280 parts of aniline (3 mol.), 270 parts of concentrated hydrochloric acid and 1000 parts of water. The solution becomes deep red and remains completely clear. It is boiled for a further 3 minutes and then allowed to run into a dilute caustic alkali solution. After washing and drying the precipitate there is obtained a resin which flows very well and can be molded into articles having good resistance to heat.

*Example 5*

540 parts (about 6 mol.) of formaldehyde solution, 700 parts of water and 25 parts of concentrated hydrochloric acid are heated to about 100° C. and there is then run in, while well stirring, a solution of 214 parts of meta-toluidine (2 mol.), 190 parts of concentrated hydrochloric acid and 1000 parts of water. Stirring is continued at 95° C. for 10 minutes and the clear red solution is then neutralized with the required quantity of caustic soda or sodium carbonate solution. After the precipitate has been washed it is thoroughly mixed with 300 parts of wood meal in a kneading machine and the mixture is dried and molded in the usual manner at pressures from 100 to 250 kg/cm$^2$ and temperatures between 150 and 180° C. There are obtained homogeneous articles having good mechanical and electrical properties.

*Example 6*

785 parts (9 mol.) of formaldehyde solution, 1000 parts of water and 40 parts (1½ mol.) of concentrated hydrochloric acid are heated to 90° C. in a vessel provided with a stirrer and a reflux condenser and 279 parts (3 mol.) of aniline are run in drop by drop, while vigorously stirring. The solution remains at boiling temperature; it becomes deep dark red and remains clear. After it has been allowed to cool somewhat, it is neutralized by pouring it into cold dilute caustic soda solution. After the precipitate has been washed and dried there is obtained a white granular product which is heated for several hours at 120° C. and then molded as described in Example 1. There are obtained dark red molded articles having good mechanical and electrical properties.

The condensation solutions or precipitated resins obtained as described in any of the foregoing examples may be worked up in various ways together with fibrous materials, such as cellulose or asbestos, into paper containing resin. The fibrous material in the beaten condition may be added to the reaction components or to the finished condensation solution, or the condensation solution may be allowed to run into the beaten pulp, whereupon the resin is precipitated on and in the fiber by eliminating the acid, the magma is washed if required, ground in the beater until the fibres have the desired length and then worked up into paper, cardboard or glazed cardboard on the Fourdrinier or cylinder paper making machine.

It is also possible to mix the precipitated resin, before or after it has been washed, with the cellulose and to work up the mixture into paper after the usual preliminary treatment. Or the cellulose which has been already beaten and ground may be mixed with the condensation solution at any stage of the reaction, or with the precipitated, or precipitated and washed, resin, whereupon the mixture is beaten and fed to the paper making machine. Finally, the resin in the dry condition may be ground to the desired fineness or granular size and added to the pulp, the mixture being worked up into paper after suitable preliminary treatment. By varying the proportion of resin it is possible to produce papers which are poor in resin as well as papers very rich in resin. In the molded condition such papers are capable of very varied applications. Softening agents, dyestuffs, hardening agents and the like may be incorporated in the resins or in the pulp.

What we claim is:—

1. The process of manufacturing moldable synthetic resins by condensation from a primary aromatic amine and formaldehyde, which comprises heating a solution of one of said components to a temperature above 50° C., combining said heated solution with the other of said components in the presence of a considerable proportion of a strong mineral acid, the proportions of said components being such that there are more than 2 mols of formaldehyde present per mol of amine during the entire condensation thereof, said condensation being effected in the absence of organic solvents, then precipitating the resultant resin by eliminating the acid, and finally washing and drying the precipitated resin, whereby a hardenable product is formed.

2. The process of manufacturing moldable synthetic resins by condensation from aniline and formaldehyde, which comprises heating a solution of one of said components to a temperature above 50° C., combining said heated solution with the other of said components in the presence of a considerable proportion of a strong mineral acid, the proportions of said components being such that there are more than 2 mols of formaldehyde present per mol of aniline during the entire condensation thereof, said condensation being effected in the absence of organic solvents, then precipitating the resultant resin by eliminating the acid, and finally washing and drying the precipitated resin, whereby a hardenable product is formed.

3. The process of manufacturing moldable synthetic resins by condensation from a primary aromatic amine and formaldehyde, which comprises heating a solution of one of said components to a temperature above 50° C., combining said heated solution with the other of said components in the presence of about an equimolecular proportion of a strong mineral acid, the proportions of said components being such that there are more than 2 mols of formaldehyde present per mol of amine during the entire condensation thereof, said condensation being effected in the absence of organic solvents, then precipitating the resultant resin by eliminating the acid, and finally washing and drying the precipitated resin, whereby a hardenable product is formed.

4. The process of manufacturing moldable synthetic resins by condensation from aniline and formaldehyde, which comprises heating a solution of one of said components to a temperature above 50° C., combining said heated solution with the other of said components in the presence of about an equimolecular proportion of a strong mineral acid, the proportions of said components being such that there are more than 2 mols of formaldehyde present per mol of aniline during the entire condensation thereof, said condensation being effected in the absence of organic solvents, then precipitating the resultant resin by eliminating the acid, and finally washing and drying the precipitated resin, whereby a hardenable product is formed.

5. The process of manufacturing moldable synthetic resins by condensation from a primary aromatic amine and formaldehyde, which comprises heating a solution of one of said components to a temperature above 50° C., combining said heated solution with the other of said components in the presence of a considerable proportion of a strong mineral acid, the proportions of said components being such that there are more than 2 mols of formaldehyde present per mol of amine during the greater part of the condensation thereof, said condensation being effected in the absence of organic solvents, then precipitating the resultant resin by eliminating the acid, and finally washing and drying the precipitated resin, whereby a hardenable product is formed.

ALPHONSE GAMS.
THEODOR SUTTER.